(12) United States Patent
Ron et al.

(10) Patent No.: US 11,789,541 B2
(45) Date of Patent: Oct. 17, 2023

(54) ADJUSTING HAPTIC FEEDBACK THROUGH TOUCH-SENSITIVE INPUT DEVICES

(71) Applicant: Microsoft Technology Licensing, LLC, Redmond, WA (US)

(72) Inventors: Uri Ron, Kfar Saba (IL); Vadim Mishalov, Tel-Aviv (IL); Shoham Dekel, Tel-Aviv (IL); Arie Yehuda Gur, Kiryat Ono (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/054,901

(22) Filed: Nov. 12, 2022

(65) Prior Publication Data

US 2023/0075360 A1  Mar. 9, 2023

Related U.S. Application Data

(63) Continuation of application No. 17/330,068, filed on May 25, 2021, now Pat. No. 11,500,467.

(51) Int. Cl.
| G06F 3/01 | (2006.01) |
| G06F 3/0354 | (2013.01) |
| G06F 3/038 | (2013.01) |
| G06F 3/044 | (2006.01) |
| G06F 3/041 | (2006.01) |

(52) U.S. Cl.
CPC .............. *G06F 3/016* (2013.01); *G06F 3/038* (2013.01); *G06F 3/03545* (2013.01); *G06F 3/044* (2013.01); *G06F 3/04162* (2019.05); *G06F 2203/04108* (2013.01)

(58) Field of Classification Search
None
See application file for complete search history.

(56) References Cited

U.S. PATENT DOCUMENTS

| 2013/0009907 A1* | 1/2013 | Rosenberg | .............. G06F 3/046 345/174 |
| 2016/0282970 A1* | 9/2016 | Evreinov | .............. G06F 3/0383 |
| 2019/0384402 A1* | 12/2019 | Huizar | ................ G06F 3/03545 |

* cited by examiner

*Primary Examiner* — Stephen T. Reed
(74) *Attorney, Agent, or Firm* — Alleman Hall Creasman & Tuttle LLP

(57) ABSTRACT

A method is presented for providing haptic feedback through a touch-sensitive input device configured to provide input to a touch-sensitive computing device. The method comprises determining a haptic perception factor based on a set of computing device inputs received from sensors of the touch-sensitive computing device, the computing device inputs including at least a posture of the touch-sensitive computing device. A haptic response profile is determined based on the haptic perception factor. Haptic devices of the touch-sensitive input device are actuated based on the determined haptic response profile. Responsive to determining a change in the haptic perception factor based on a change in the posture of the touch-sensitive computing device the haptic response profile is then adjusted based on the changed haptic perception factor. The haptic devices of the touch-sensitive input device are then actuated based on the adjusted haptic response profile.

20 Claims, 10 Drawing Sheets

ADJUSTING HAPTIC FEEDBACK THROUGH TOUCH-SENSITIVE INPUT DEVICES

CROSS REFERENCE TO RELATED APPLICATIONS

This application is a continuation of U.S. patent application Ser. No. 17/330,068, filed May 25, 2021, the entirety of which is hereby incorporated herein by reference for all purposes.

BACKGROUND

Smartphones, tablets, and other computing devices with touch-sensitive displays allow for input using fingers, an electronic stylus, etc. A touch-sensitive input device may include haptic actuators configured to provide feedback to the user as a means of enhancing the user experience. As one example, a stylus may provide haptic output in the form of vibration applied to a body of the stylus via an internal motor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method is presented for providing haptic feedback through a touch-sensitive input device configured to provide input to a touch-sensitive computing device. The method comprises determining a haptic perception factor based on a set of computing device inputs received from sensors of the touch-sensitive computing device, the computing device inputs including at least a posture of the touch-sensitive computing device. A haptic response profile is determined based on the haptic perception factor. Haptic devices of the touch-sensitive input device are actuated based on the determined haptic response profile. Responsive to determining a change in the haptic perception factor based on a change in the posture of the touch-sensitive computing device the haptic response profile is then adjusted based on the changed haptic perception factor. The haptic devices of the touch-sensitive input device are then actuated based on the adjusted haptic response profile.

DETAILED DESCRIPTION

Figure 1:
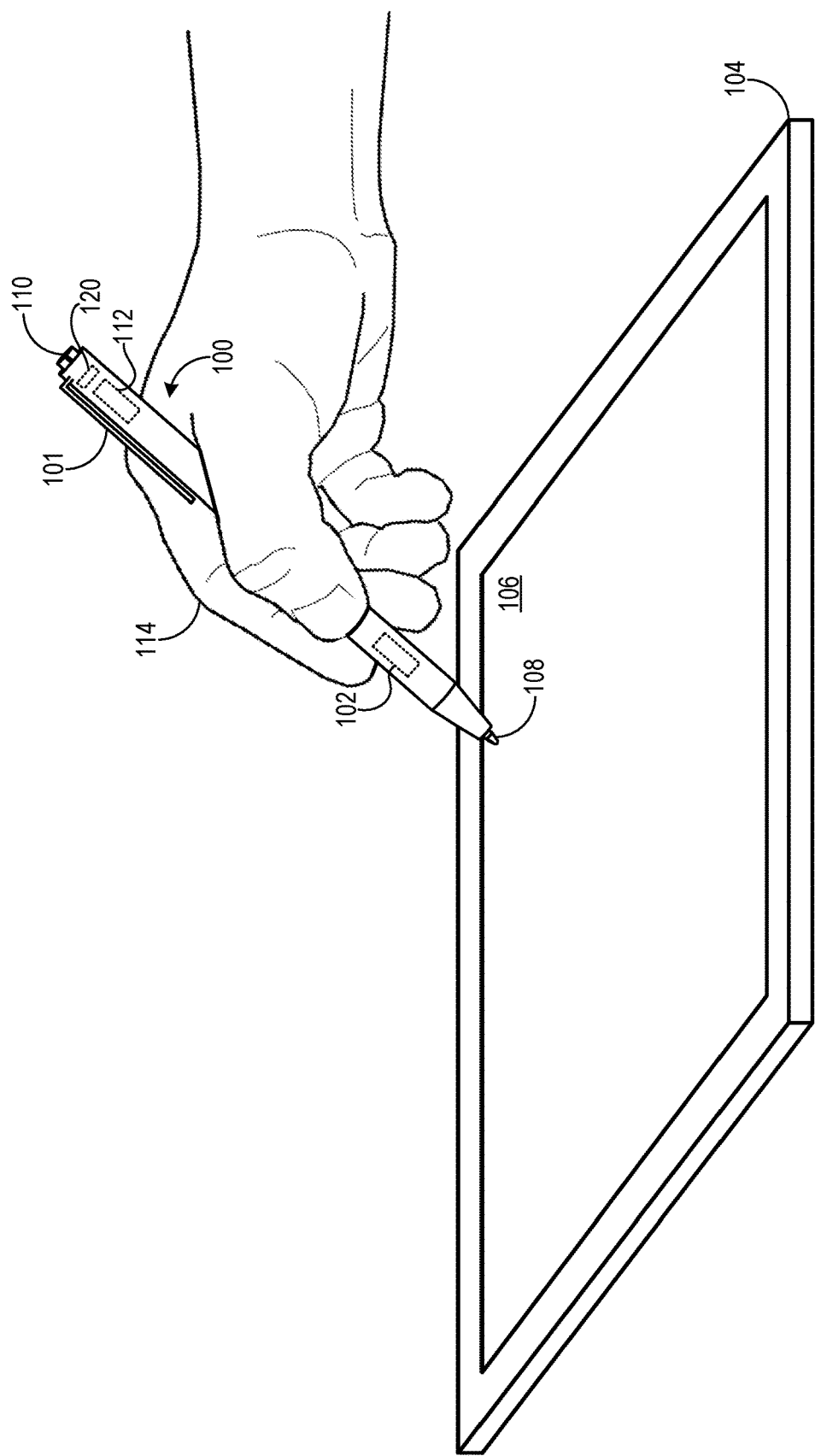
FIG. 1 depicts an example of touch-sensitive input in the form of a user interacting with a touch-sensitive display via a touch-sensitive input device.

A variety of input devices have been developed that provide haptic output. As one example, a haptic stylus may provide haptic output in the form of vibration applied to a body of the stylus via an internal motor. Styli and other input devices may provide haptic output for a variety of purposes, including but not limited to simulating a tactile sensation (e.g., resulting from the traversal of a virtual surface such as gravel, or from touching a virtual object), simulating ink-on-surface feel sensations, confirming a user input (e.g., in response to user selection of a graphical user interface element), and/or providing another type of feedback (e.g., an indication of the state of an input device such as a battery level, the state of an application).

To achieve haptic output, a haptic feedback mechanism such as a motor may be arranged within the body of the stylus, such as near the tip of the stylus. This localized positioning of the motor, however, may be such that users perceive noticeably different haptic outputs as their grip and finger positions on the stylus change, which tends to occur in typical stylus use scenarios. Further, the haptic output may be dampened by pressure between the stylus and the touch-sensitive computing device it is being used with. This dampening may be exacerbated if the user is also pressing on the touch-sensitive computing device with their hand while using the stylus, if the computing device is laying on a surface, etc. Conversely, if haptic feedback is provided to a user holding the stylus loosely while hovering over the touch-sensitive computing device, the force, if too high, may be distracting or cause the user to drop or lose grip on the stylus. As such, there are numerous challenges with providing a consistent and favorable user experience with a haptic stylus and corresponding computing device.

Accordingly, systems and methods are presented herein that may be used to generate a consistent and favorable experience for a user operating a touch-sensitive input device with a touch-sensitive computing device. Sensors, both within and on the touch-sensitive input device and within and on the touch-sensitive computing device, provide inputs to a controller which uses the sensory information to determine a haptic perception factor. Based at least in part on this haptic perception factor, the controller may determine how much and/or what type of haptic actuation is necessary to generate a consistent haptic sensation profile, and adjust the intensity, frequency, or other characteristics of the haptic actuation accordingly. In this way, the user may experience consistent haptic feedback, whether holding the stylus in the air or pressing down upon the touch-sensitive computing device with the stylus when the computing device is resting between the palm of the user's hand and a solid table. In some cases, a user may specify a preferred amount of haptic sensation (e.g., via a user profile) which they would like to feel when haptic feedback is provided.

FIG. 1 depicts an example touch-sensitive input device in the form of a stylus 100. While described primarily using the stylus form as an example any touch-sensitive input device configured to sense the touch of a user, provide input to a touch-sensitive computing device, and deliver haptic feedback may be utilized. Stylus 100 includes an elongated body 101 in the form factor of a pen, though the body may assume any suitable form. As shown in the depicted example, stylus 100 is operable to provide user input to a computing device 104. Computing device 104 is shown in the form of a mobile computing device (e.g., tablet) having a touch-sensitive display 106, but may assume any suitable form. Any suitable type of user input may be provided to computing device 104 using stylus 100. As examples, stylus 100 may be used to draw graphical content on touch-sensitive display 106 of computing device 104, modify graphical content (e.g., resize, reposition, rotate), erase graphical content, select graphical user interface (GUI) elements, and/or provide gestural input.

To enable the provision of user input from stylus 100 to computing device 104, the stylus may include a communication subsystem with which data may be transmitted from the stylus to the computing device. For example, the communication subsystem may include a radio transmitter for wirelessly transmitting data to and from computing device 104 along a radio link. As another example, the communication subsystem alternatively or additionally may include a capacitive transmitter for wirelessly transmitting data to and from computing device 104 along a capacitive link. The capacitive link may be established between the capacitive transmitter and a touch-sensitive display 106 having a capacitive touch sensor, for example.

Any suitable data may be transmitted to computing device 104 via the communication subsystem, including but not limited to indications of actuation at stylus 100 (e.g., depression of a stylus tip 108 or a stylus end 110), data regarding the position of the stylus relative to the computing device (e.g., one or more coordinates), a power state or battery level of the stylus, and data from a motion sensor on-board the stylus (e.g., accelerometer data with which stylus gestures may be identified). Moreover, in some examples, data regarding the locations of contact points between a user hand and stylus 100, which may be sensed by the stylus as described below, may be transmitted to computing device 104 via the communication subsystem. It will be understood that any suitable mechanism may be used to transmit information from stylus 100 to computing device 104. Additional examples include optical, resistive, and wired mechanisms. Example hardware including a processor and communication subsystem that may be incorporated by stylus 100 to implement the disclosed approaches is described below with reference to FIG. 10.

Stylus 100 is configured to provide haptic feedback to users. To this end, stylus 100 includes a haptic feedback mechanism 102 configured to apply haptic output to body 101. As shown in FIG. 1, haptic feedback mechanism 102 is arranged within body 101 toward stylus tip 108, but may be provided at any suitable location at stylus 100. Haptic feedback mechanism 102 may employ any suitable component(s) to provide haptic feedback as described herein. As one example, haptic feedback mechanism 102 may include a motor that applies haptic output to body 101 in the form of vibration induced in the body. Haptic feedback mechanism 102 may additionally or alternatively include electrostatic, ultrasonic, auditory, or other haptic mechanisms. In some examples, multiple haptic feedback mechanisms are provided at different locations within a stylus.

Stylus 100 further includes a sensor subsystem schematically depicted at 112. Sensor subsystem 112 may be configured to output sensor data indicating locations and local pressures along body 101 of the contact points formed between a user hand 114 and body 101 as detected by multiple grip sensing elements (not shown) such as a capacitive sleeve. Sensor subsystem 112 may be further configured to indicate a pressure between user hand 114 and stylus body 101 at one or more of the contact points. Additional sensing elements may include one or more tip pressure sensors positioned at a tip and/or an opposite end of stylus 100. One or more electrostatic sensors may be included in the tip and/or opposite end of stylus 100. Sensor subsystem 112 may further include one or more accelerometers, gyrometers, proximity sensors, etc. configured to provide information regarding the pose, velocity, and orientation of stylus 100. Data received from sensor subsystem 112 and/or from computing device 104 may be stored at memory 120.

Computing device 104 may also include a sensor subsystem (not shown). For example, computing device 104 may include capacitive touch sensors, peripheral grip sensors, accelerometers, gyrometers, proximity sensors, hall sensors, etc. In some examples, computing device 104 may include two or more touch-sensitive displays coupled by one or more hinges, and may thus include one or more hinge angle sensors. Touch-sensitive display 106 may be configured to output capacitance values for each touch-sensing pixel or capacitive grid point in the form of heat maps in order to determine which, if any areas of the capacitive touch sensor are being touched.

Computing device 104 may be configured to communicate with stylus 100 via electrostatic circuitry, radio circuitry, other wireless communication circuitry, etc. In this way, sensor information may be shared between computing device 104 and stylus 100. In this way, common inputs, such as speed and velocity of stylus tip 108 across touch-sensitive display 106 may be coordinated. Further, ambiguous information may be resolved. As an example, stylus 100 may not be able to discern whether stylus tip 108 is being pressed against touch-sensitive display 106 or pressed by a thumb of the user. Other components of example computing systems are described herein and with regard to FIG. 10.

A stylus may be used for both specific object selection, akin to a user's finger, and for providing less structured input, such as writing, drawing, circling objects, etc. As such, different types of haptic feedback may be for provided for automatic feedback modes, such as inking and for interactive feedback modes, such as di splay object selection.

Haptic feedback may be used to generate a pleasing and reproduceable writing experience, such as a perception of a pen or pencil writing on real paper. Some stylus tip compositions glide on glass surfaces with minimal friction. This decreases performance, accuracy, and control for a user attempting to write on the surface of a touch-sensitive display. Previous solutions include exchangeable stylus tips with different friction coefficients, and surface treatments or film overlays for touch-sensitive displays. However, these solutions may not be compatible for all applications of the touch-sensitive display, especially if the user also uses the computing device without a stylus.

Figure 2A:
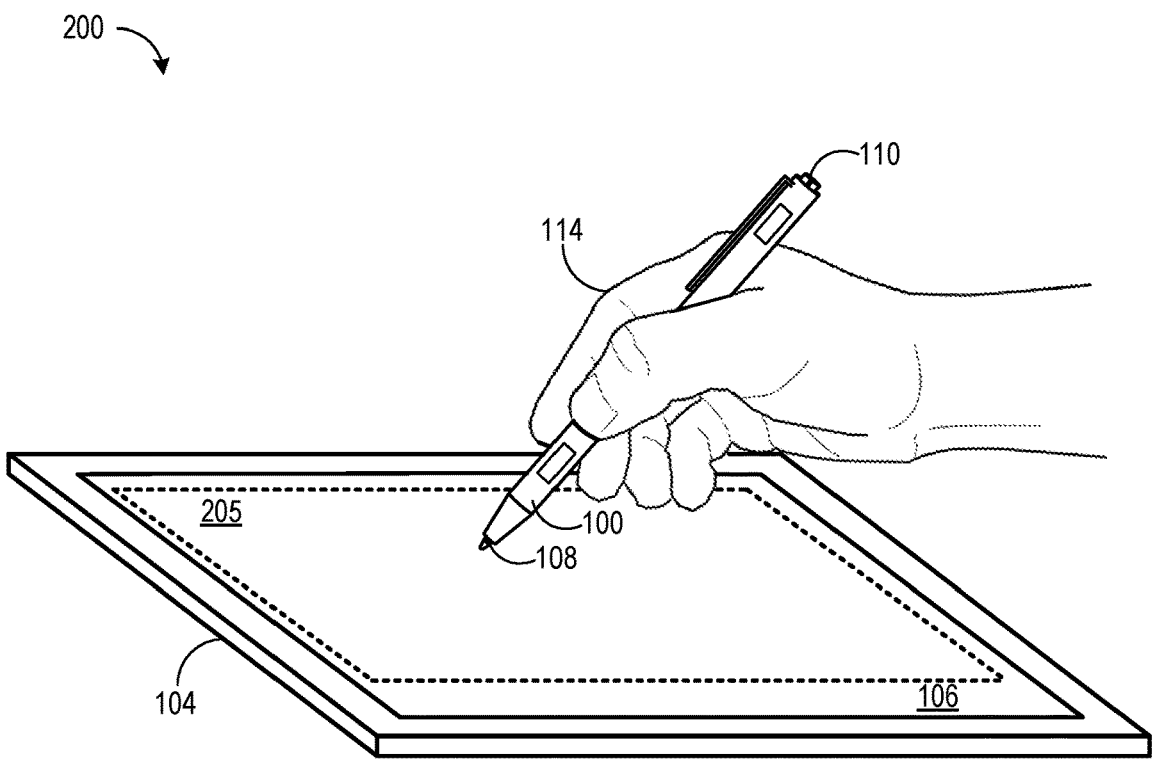
FIG. 2A depicts a user providing input with a stylus in an example automatic feedback mode.
Figure 2B:
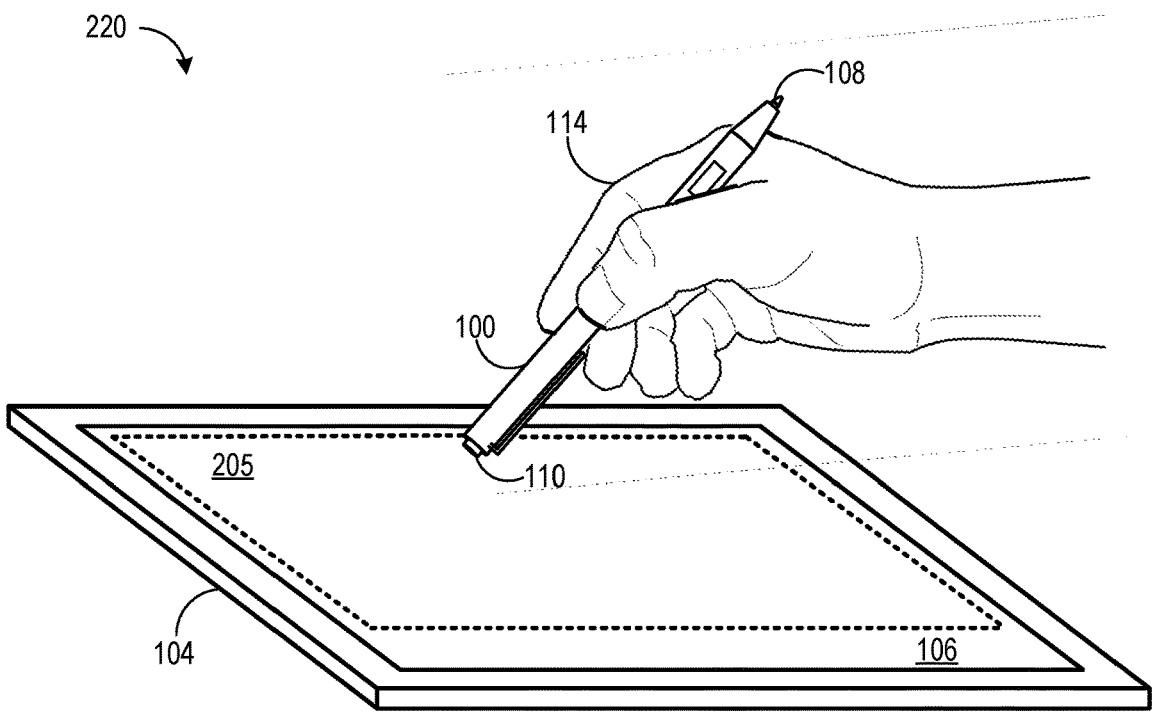
FIG. 2B depicts a user providing input with a stylus in another example automatic feedback mode.

FIGS. 2A and 2B show examples of a user providing input to computing device 104 with stylus 100 in interactive feedback modes. In an interactive feedback mode, subtle haptic feedback may be provided via the stylus to mimic the feeling of writing on a frictive surface. In FIG. 2A, at 200, the user is pressing stylus tip 108 onto touch-sensitive display 106, which is presenting inking canvas 205. In FIG. 2B, at 220, the user is pressing stylus end 110 onto touch-sensitive display 106 within inking canvas 205. At 200, the user may be inking content onto inking canvas 205, while at 220, the user may be erasing content from inking canvas 205.

In such an interactive feedback mode, the haptic feedback provided via stylus 100 may mimic the feel of pen-on-paper (FIG. 2A) or eraser-on-paper (FIG. 2B), or any other desired combination of writing implement and textured surface. For example, haptic feedback may mimic chalk on a chalkboard, crayons on cardboard, or other combinations. The haptic feedback may also generate a small amount of movement of stylus tip 108 or stylus end 110.

In some examples, the haptic feedback may be initiated automatically when stylus tip 108 or stylus end 110 contacts touch-sensitive display 106 within inking canvas 205, and may be applied continuously, then ended when stylus tip 108 or stylus end 110 is removed from touch-sensitive display 106 or leaves inking canvas 205. In other examples, the haptic feedback may be initiated automatically responsive to movement of stylus tip 108 or stylus end 110 within inking canvas 205.

Accordingly, computing device 104 and stylus 100 may share information regarding the type of application being executed on computing device 104, so that stylus 100 is aware that an inking canvas is being presented and that an automatic feedback mode is likely to be invoked. Sensor data, such as capacitive sensor data from touch-sensitive display 106 and tip pressure sensor data from stylus 100 may be exchanged to determine the position, velocity, and pressure of the stylus tip 108 on touch-sensitive display 106.

Haptic feedback may be adjusted based at least in part on determined pressure between stylus tip 108 or stylus end 110 and touch-sensitive display 106, angle of incidence between stylus tip 108 or stylus end 110 and touch-sensitive display 106, as well as other factors, as described further herein. Haptic feedback may be further adjusted with velocity, mimicking a pen or eraser traversing a rough surface. In some examples, haptic feedback may be increased or decreased in pulses while operating in an interactive feedback mode so as to provide interactive feedback (e.g., battery level decreasing below a threshold, new message received).

Scenarios where an inking canvas is not being utilized may use an interactive feedback mode to govern haptic feedback. Specific events may generate haptic triggers, which may in turn result in haptic feedback being applied through the stylus. In general, manual triggers may be generated when the user performs a specific task related to material presented on the touch-sensitive display and receives action-driven feedback in return.

Figure 3A:
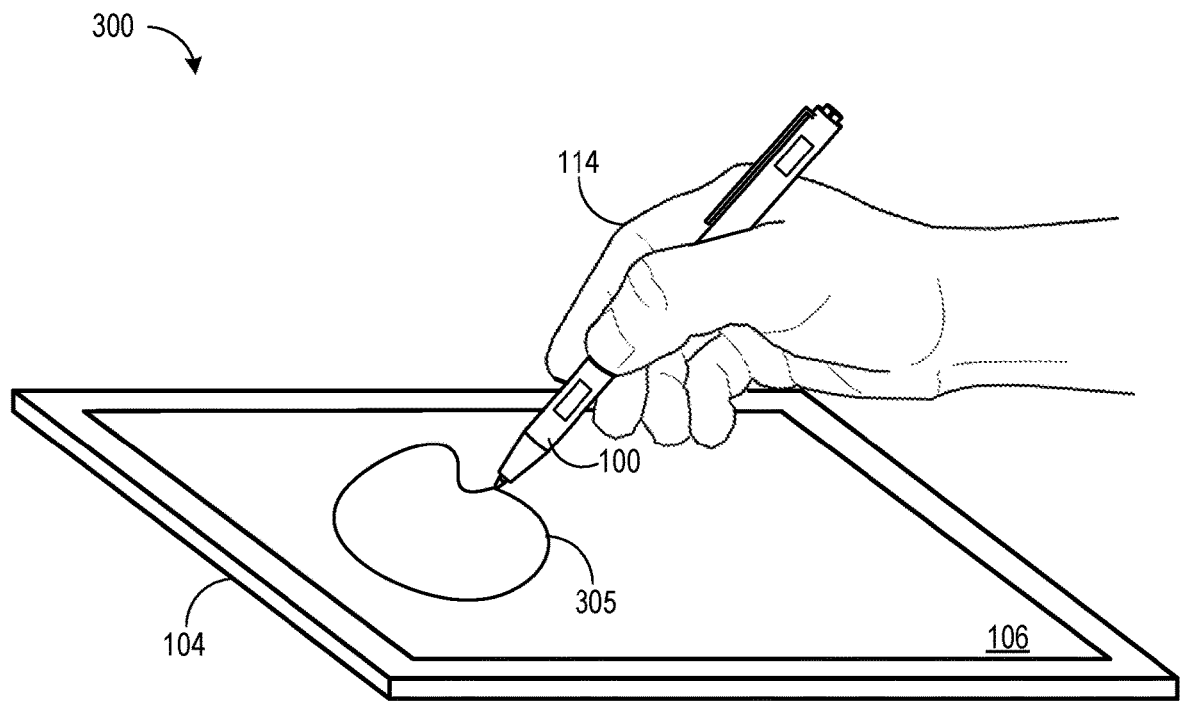
FIG. 3A depicts a user providing input with a stylus in an example interactive feedback mode.
Figure 3B:
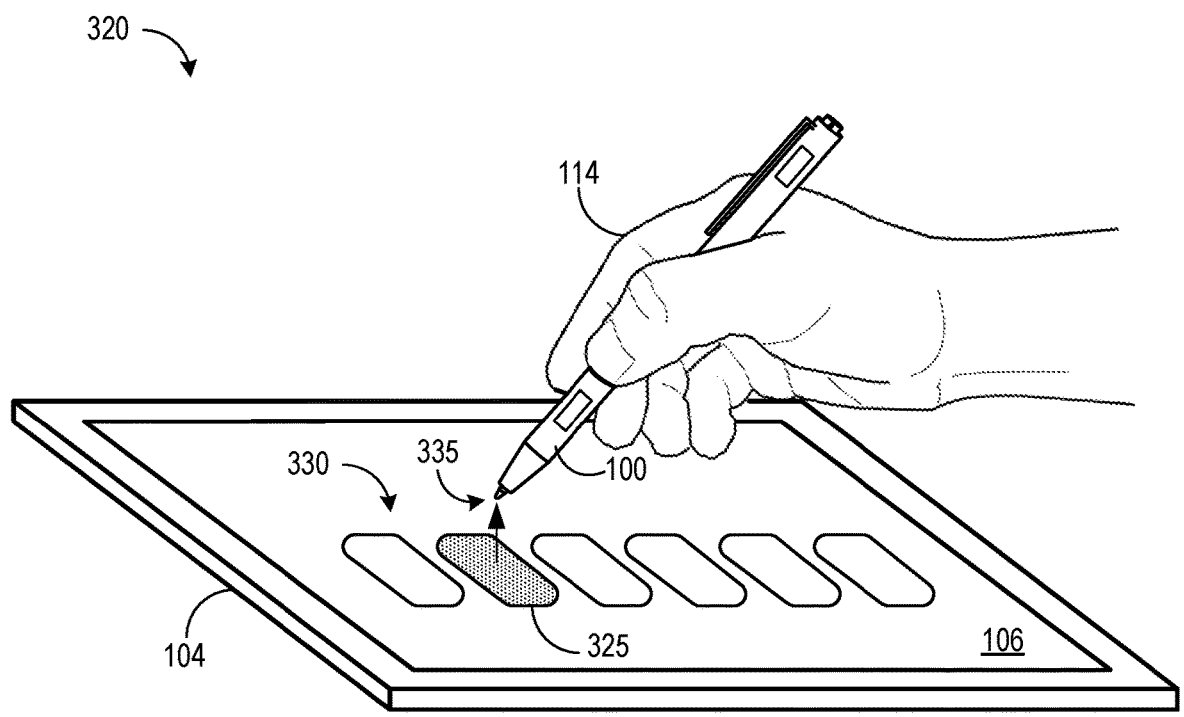
FIG. 3B depicts a user providing input with a stylus in another example interactive feedback mode.

FIGS. 3A and 3B depict a user providing input to touch-sensitive display 106 with stylus 100 in example interactive feedback modes. In FIG. 3A, at 300, a user is using stylus 100 to draw a lasso 305 over a portion of displayed content presented on touch-sensitive display 106. When lasso 305 is closed, haptic feedback may be provided via stylus 100 while stylus tip 108 is in contact with touch-sensitive display 106.

In FIG. 3B, at 320, the user is selecting an object 325, e.g., a button, from a number of display objects 330 presented on touch-sensitive display 106. In this scenario, as shown at 335, the haptic feedback may not be provided until stylus tip 108 has been removed from touch-sensitive display 106, completing the depression-and-release of object 325. Similar workflow may be used for lassoing objects or other actions where completion of the task includes removing stylus 100 from touch-sensitive display 106. Haptic feedback may be provided in other hovering scenarios, such as when a user selects an object by hovering over it for a threshold duration. Hovering may be determined based at least in part on capacitive sensors in touch-sensitive display 106 and tip pressure sensors in stylus 100.

When stylus 100 is hovering over touch-sensitive display 106, it is only contacted by hand 114, and thus the only dampening of the feedback is provided by hand 114, whereas when stylus 100 is contacting touch-sensitive display 106, the display itself also dampens the haptic feedback. As such, the user may be more sensitive to haptic feedback when stylus 100 is hovering. Accordingly, to maintain a consistent level of haptic feedback, haptic actuation levels may be reduced if it is determined that stylus 100 is hovering.

Figure 4B:
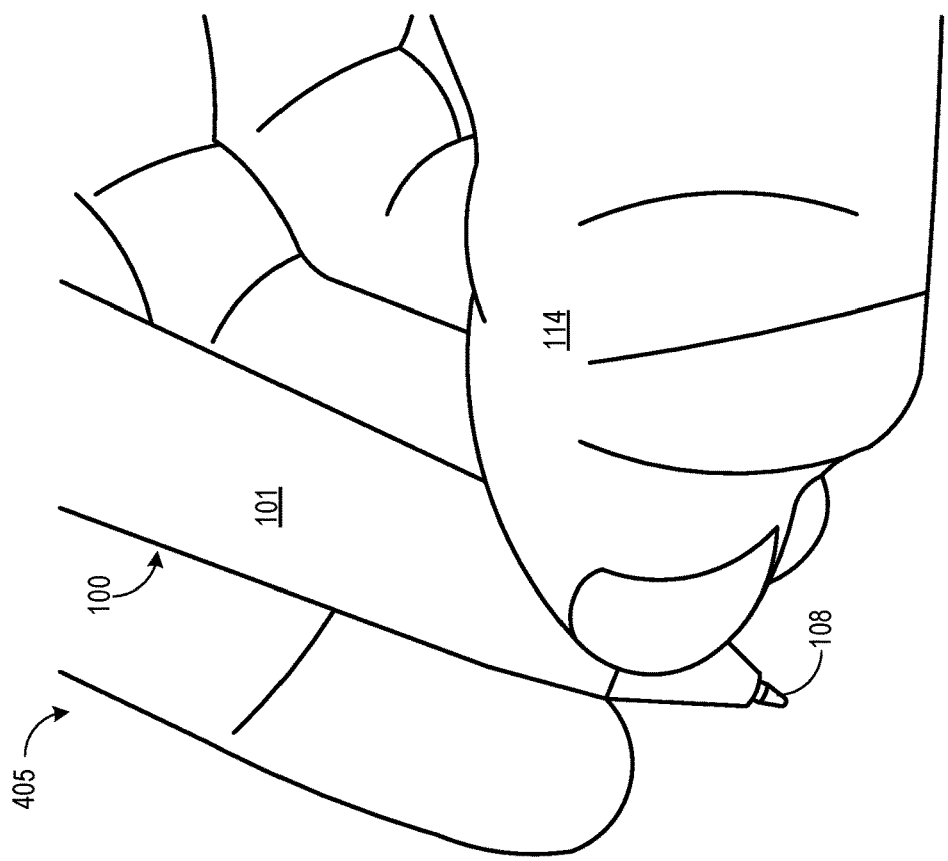
FIG. 4B depicts a user holding a stylus with another example hand grip.
Figure 4A:
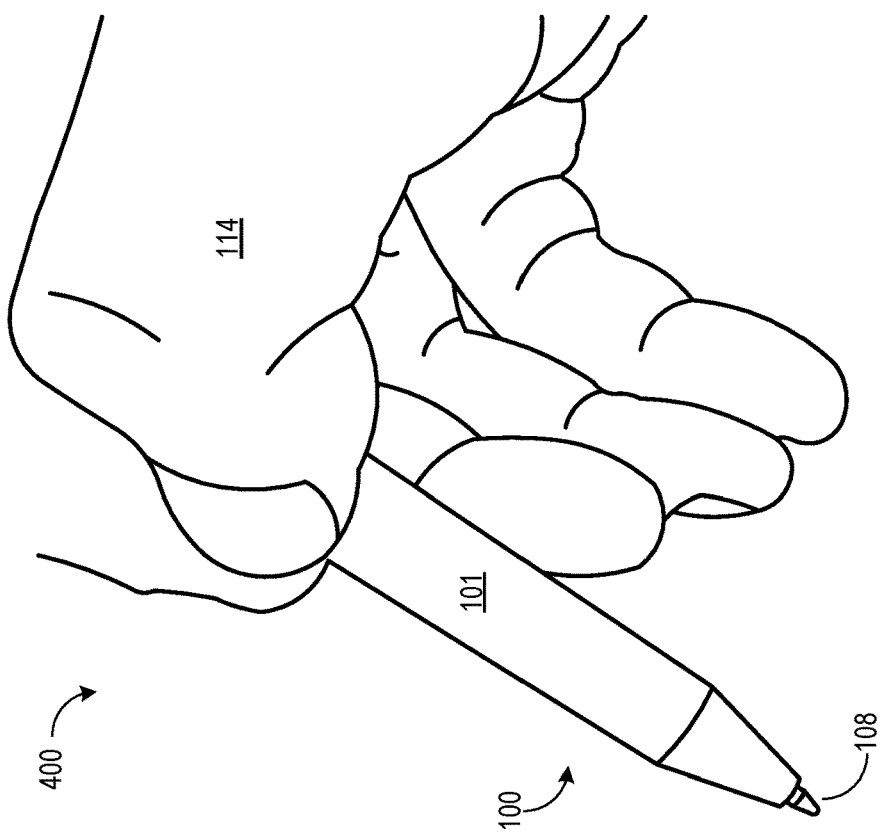
FIG. 4A depicts a user holding a stylus with an example hand grip.

A user's grip on a stylus may impact the amount of haptic sensation perceived at the fingers of the user. FIGS. 4A and 4B depict a user holding a stylus with example hand grips. At 400, FIG. 4A shows a user's hand 114 holding stylus 100 near the middle of body 101. At 405, FIG. 4B depicts user's hand 114 holding stylus 100 near the stylus tip 108. In other scenarios, a user may hold the stylus near the stylus end, may hold the stylus with a fist, etc. Some hand grips may only include contact points for two or three fingertips, while others may also include contact points for inter-finger webbing. The position, grip style, contact points, and grip pressure may all contribute to the amount of haptic sensation dampening. The location of grip contact points relative to the positioning of haptic actuators within the stylus body may also contribute to the user's perception of haptic sensations.

As such, grip-determining inputs may include grip sensors positioned axially and circumferentially around stylus 100 as well as capacitive touch sensors on a touch-sensitive display. The contact points of the user's grip may further inform the angle of contact of stylus tip 108, particularly when analyzed along with the tip pressure and tip angle.

Figure 5B:
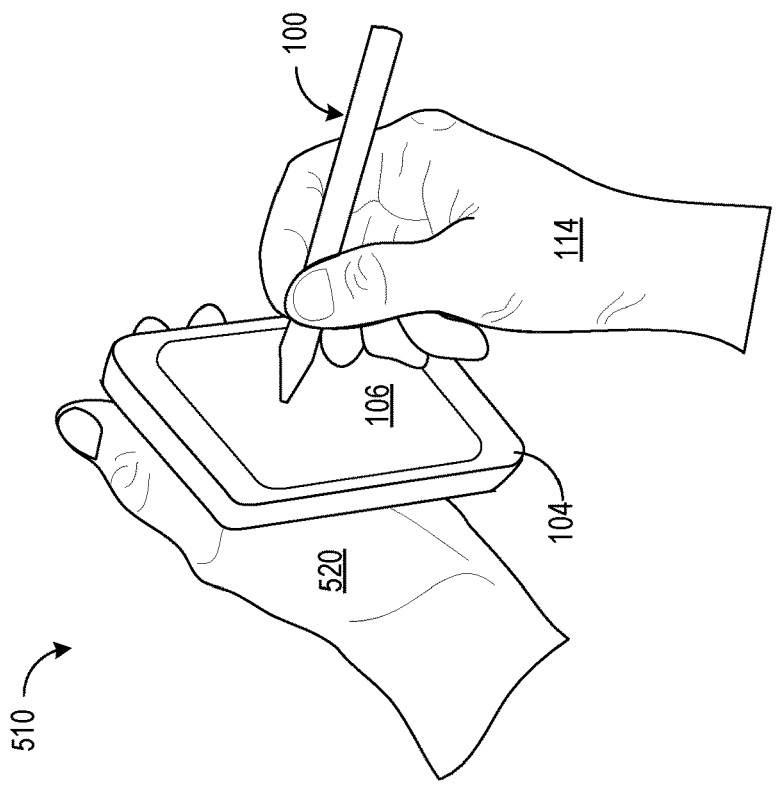
FIG. 5B depicts a touch-sensitive computing device being held in a user's hand.
Figure 5A:
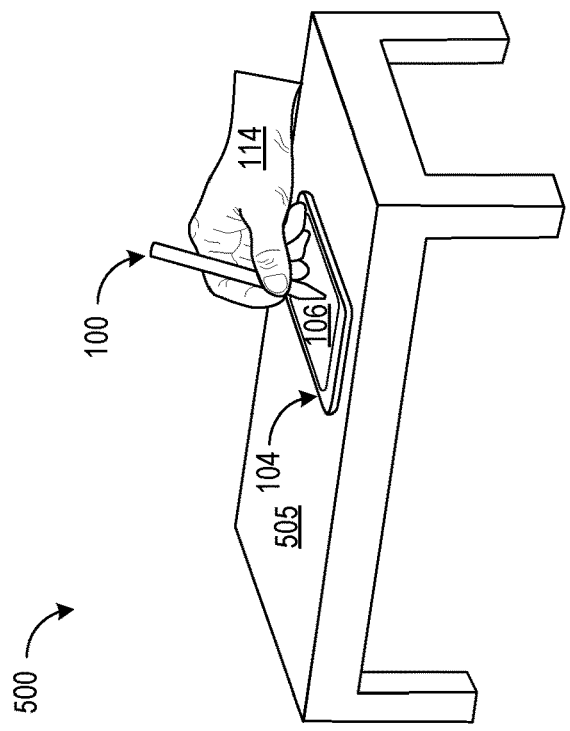
FIG. 5A depicts a touch-sensitive computing device positioned on a solid surface.

The posture of the computing device, and in particular, whether the face of the computing device opposite the touch-sensitive display is contacting another surface may also contribute to dampening haptic sensations generated at the stylus. As examples, FIGS. 5A and 5B depict different postures for a computing device. At 500, FIG. 5A shows computing device 104 resting on a solid surface (e.g., table 505) while user's hand 114 engages touch-sensitive display 106 with stylus 100. At 510, FIG. 5B shows user's opposite hand 520 holding computing device 104 while user's hand 114 engages touch-sensitive display 106 with stylus 100. In other examples, computing device 104 may be propped upright via a kickstand or other mechanism. While FIG. 5A shows computing device 104 resting on a solid surface, other scenarios may have computing device 104 resting on a more pliable surface. Each of these scenarios may impact the dampening of haptic sensations, as the haptic sensation is dampened by the computing device and by the surface supporting the computing device.

Postures of the computing device may be determined by motion sensors, accelerometers, gyroscopes, proximity sensors, etc. For example, if the computing device is not moving, it is unlikely that the device is being held by the user. It may not be possible to discern the type of static surface the device is placed on. However, this may be informed if the user manually adjusts the level of desired haptic feedback. Further, machine learning may be used to determine if the user consistently performs certain tasks in certain environments (e.g., spreadsheet applications on an office table vs. drawing applications on a pillow in bed).

Dampening of haptic sensation may also be impacted by how and whether the user's hand is contacting the touch-sensitive display while using the stylus. In general, a greater contact area between the user's hand and the computing device increases the amount of dampening. The position of the user's hand relative to the point of stylus contact, and to the edges of the touch-sensitive display may also impact the user's perception of haptic sensations, particularly in an automatic feedback mode such as inking.

Figure 6A:
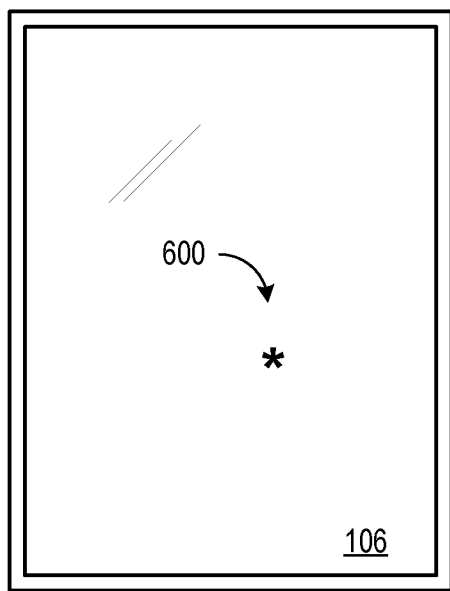
FIG. 6A depicts a heat map for a touch-sensitive computing device featuring a contact point for a stylus.
Figure 6B:
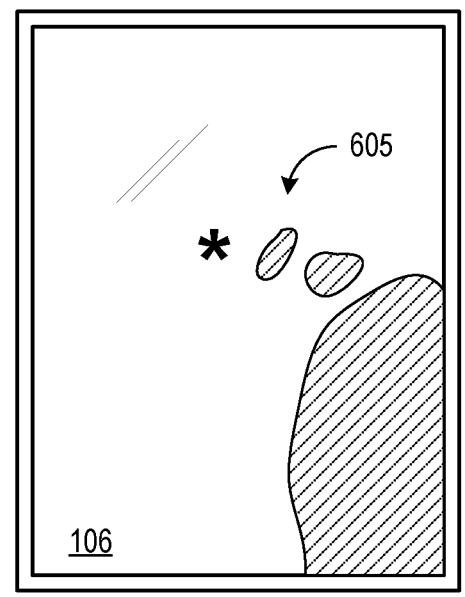
FIG. 6B depicts a heat map for a touch-sensitive computing device featuring contact points for a stylus and a palm of a user's hand.
Figure 6C:
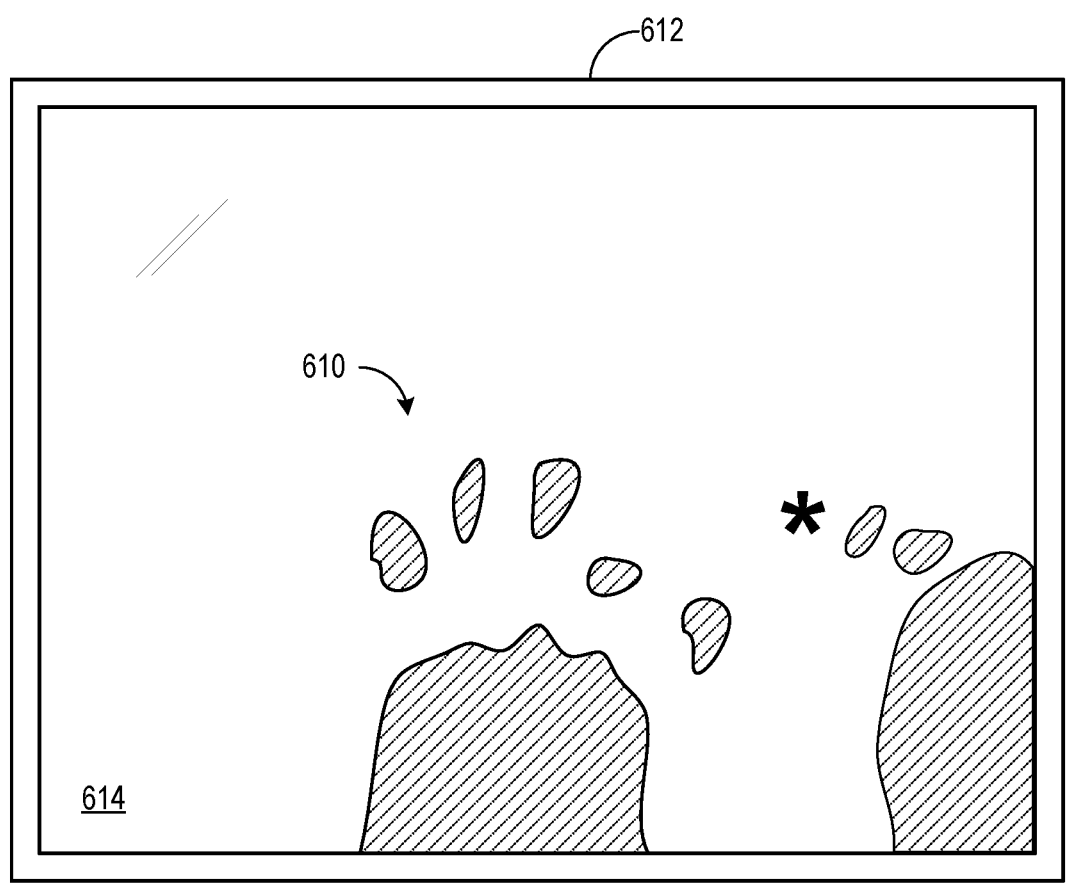
FIG. 6C depicts a heat map for a touch-sensitive computing device featuring contact points for a stylus, a palm of a user's hand, and a portion of the user's second hand.

FIGS. 6A-6C show example heat maps on a touch-sensitive display corresponding to different hand postures and thus to different amounts of dampening. As described with regard to FIG. 1, heatmaps may be generated based at least in part on capacitive data for each pixel or grid point on the touch-sensitive display. FIG. 6A shows an example heat map 600, whereby touch-sensitive display 106 is only contacted by a stylus (asterisk). FIG. 6B shows an example heat map 605 whereby a user is contacting touch-sensitive display with both a stylus and the palm of the hand holding the stylus. FIG. 6C shows an example heat map 610 for a large-scale computing device 612 having a touch-sensitive display 614. The size of the computing device itself may impact dampening, with larger devices comprising more material and a larger surface area with which to dissipate haptic sensations. In the example of FIG. 6C, the user is contacting touch-sensitive display 614 with both hands and the stylus, further dampening haptic sensations from the stylus.

Foldable computing devices may be configured to adopt numerous poses which may impact dampening of haptic sensations. As described with regard to FIG. 1, the addition of a hinge angle sensor and presence of multiple touch-sensitive displays may generate additional sensor data that may be used to discern the posture of the device and to inform haptic actuation at the stylus.

Figure 7C:
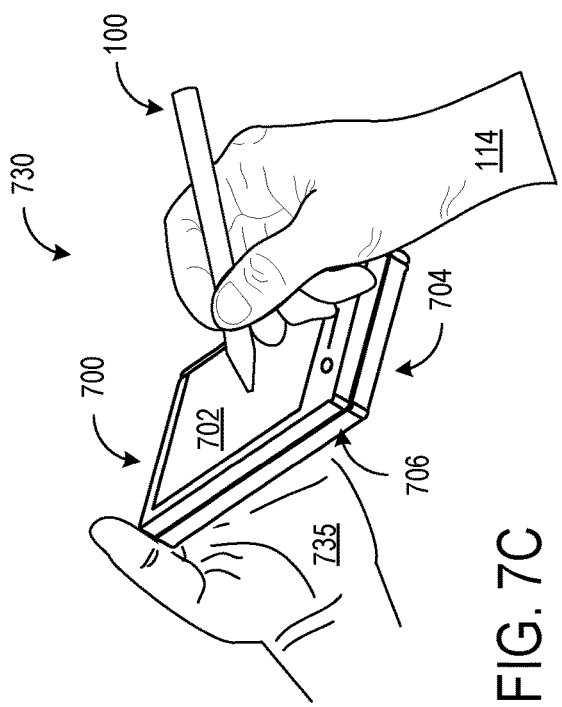
FIG. 7C depicts a foldable computing device in a back-to-back pose held in a user's hand.
Figure 7D:
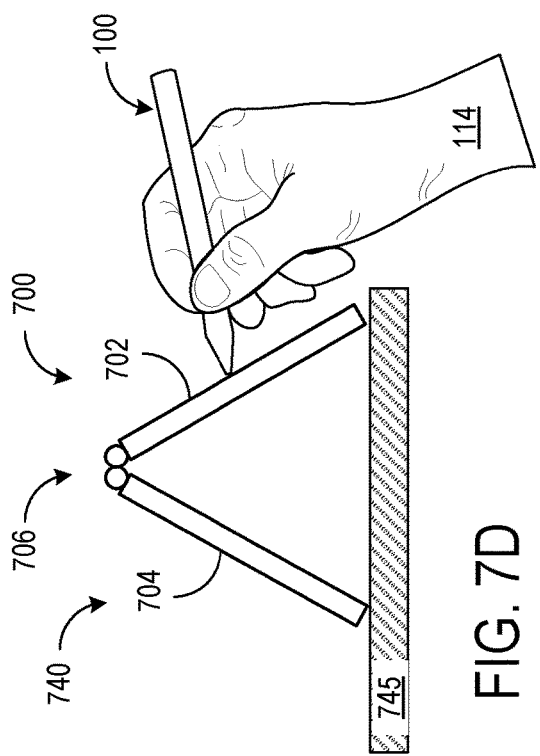
FIG. 7D depicts a foldable computing device in a tented pose positioned on a flat surface.
Figure 7A:
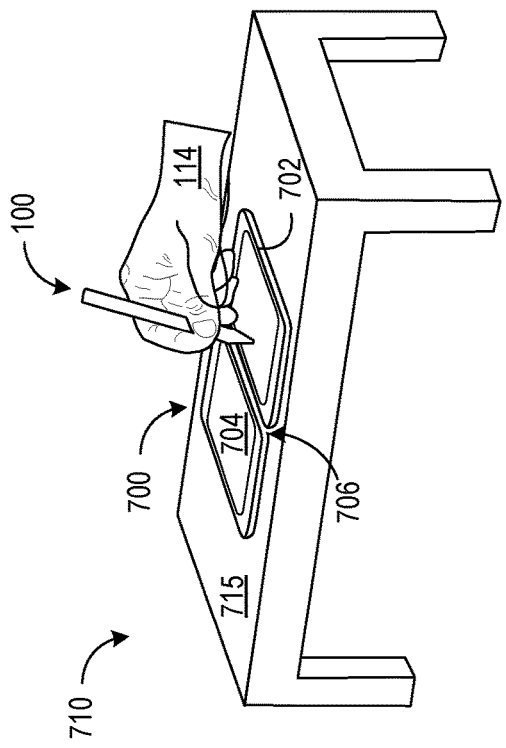
FIG. 7A depicts a foldable computing device in a flat configuration positioned on a flat surface.
Figure 7B:
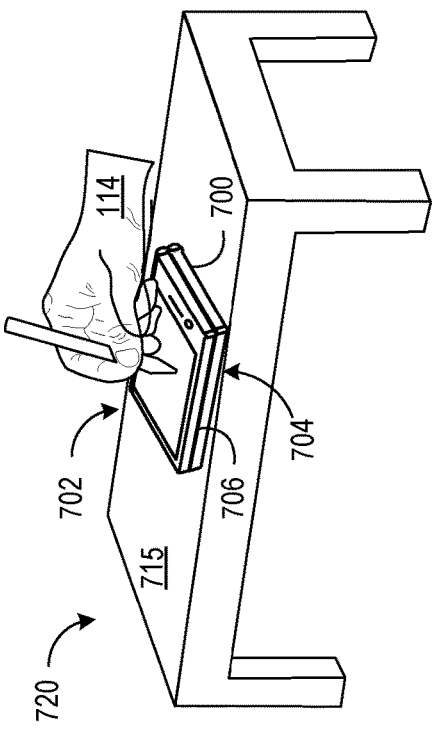
FIG. 7B depicts a foldable computing device in a back-to-back pose positioned on a flat surface.

FIGS. 7A-7D depict a foldable computing device 700 having a first touch-sensitive display 702 coupled to a second touch-sensitive display 704 via a hinge 706. At 710, FIG. 7A depicts foldable computing device 700 in a flat configuration with a hinge angle of 180°, computing device 700 positioned on a flat, solid surface (e.g., table 715), while user's hand 114 provides input from stylus 100 to first touch-sensitive display 702.

At 720, FIG. 8B depicts foldable computing device 700 in a back-to-back pose with a hinge angle of 360°, computing device 700 positioned with second touch-sensitive display 704 facing a flat, solid surface (e.g., table 715), while user's hand 114 provides input from stylus 100 to first touch-sensitive display 702. In this configuration, with the touch-sensitive displays collapsed, more haptic sensation may be absorbed by computing device 700 than for the scenario shown at 710, where first touch-sensitive display 702 is directly contacting table 715.

At 730, FIG. 7C depicts foldable computing device 700 in a back-to-back pose with a hinge angle of 360°, computing device 700 positioned with second touch-sensitive display 704 facing a second hand 735 of a user, while user's hand 114 provides input from stylus 100 to first touch-sensitive display 702.

At 740, FIG. 7D depicts foldable computing device 700 in a tented pose with a hinge angle of 270°, computing device 700 positioned with edges opposite hinge 706 contacting a flat, solid surface 745, while user's hand 114 provides input from stylus 100 to first touch-sensitive display 702. In some scenarios, the user may hold computing device 700 in a tent pose with one or more fingers of their opposite hand positioned between screens, providing a different dampening profile than for the example shown at 740. As such, the hinge angle and heat maps obtained from both first touch-sensitive display 702 and second touch-sensitive display 704 may be provided as computing device inputs for determining an amount of haptic dampening.

Figure 8:
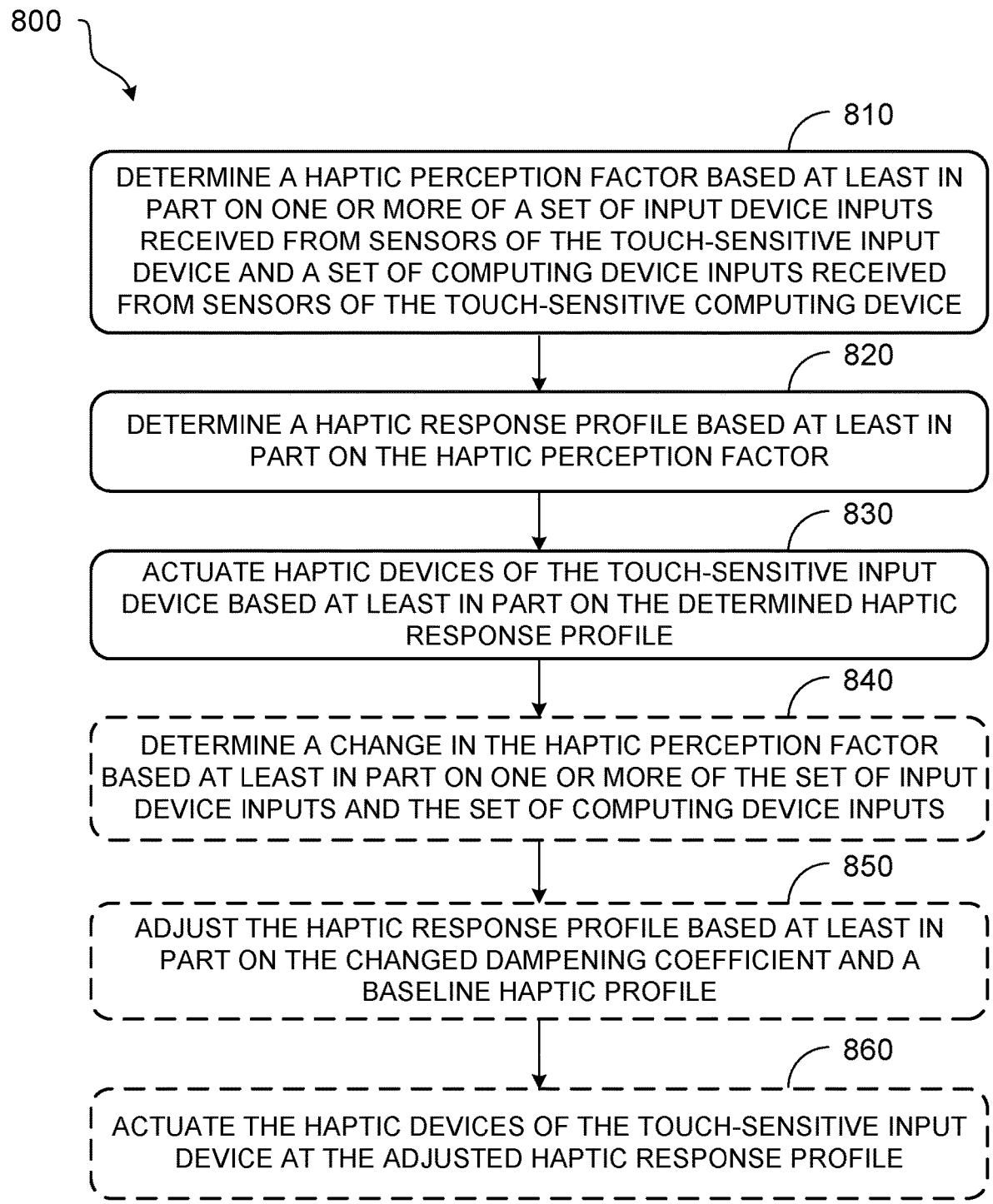
FIG. 8 depicts an example method for providing haptic feedback through a touch-sensitive input device being used to provide input to a touch-sensitive computing device.

FIG. 8 depicts an example method 800 for providing haptic feedback through a touch-sensitive input device being used to provide input to a touch-sensitive device. Method 800 may be executed by a touch-sensitive input device, such as stylus 100 when used in concert with a touch-sensitive computing device, such as computing device 104. In some examples, all or part of method 800 may be executed by a touch-sensitive computing device.

At 810, method 800 includes determining a haptic perception factor based at least in part on one or more of a set of input device inputs received from sensors of the touch-sensitive input device and a set of computing device inputs received from sensors of the touch-sensitive computing device. As described, the haptic perception factor may be based at least in part on inputs from touch-sensitive input device sensors such as grip sensors, tip pressure sensors, accelerometers, gyrometers, proximity sensors, etc. and/or inputs from touch-sensitive computing device sensors such as capacitive touch sensors, peripheral grip sensors, accelerometers, gyrometers, proximity sensors, hall sensors, hinge angle sensors, etc. Computing device inputs may further include information about the nature of the device, such as size, thickness, materials, etc. that may influence dampening of haptic feedback, as well as indications of active applications, content currently presented on a device display, and other information that may cause a change in user perception of haptic feedback. The haptic perception factor may be determined via a lookup table, calculated as a stored function of inputs, etc.

Inputs may be weighted based at least in part on their influence on haptic perception, and may not be weighted at all if not applicable. For example, if the touch-sensitive input device is hovering, the set of computing device inputs from computing device sensors may be weighted as 0. If the user places the touch-sensitive input device on a table, the set of input device inputs may be weighted as 0, or may be weighted heavily, so as to prevent unnecessary haptic actuation when the touch-sensitive input device is not being held by the user. Further, by weighting the inputs, the haptic perception factor may be more accurately determined. For example, contact area between the user's hand and the touch-sensitive computing device may be weighted differently depending on whether the user's hand is over the center of the touch-display vs at an edge of the touch-display. If the user is gripping the touch-sensitive input device with a certain grip location, pressure, and angle that makes the input device haptics more susceptible to dampened haptic sensations, the weights of the corresponding computing device inputs may be increased. As such situational weighting of inputs may be used to generate a haptic perception factor that more closely approximates the user's current use scenario.

Inputs may be interactive and/or additive. For example, if the inputs indicate the user is gripping the touch-sensitive input device tightly and placing their palm on the touch-sensitive display, the associated inputs may be used to generate a greater haptic perception factor than either group of inputs alone. In some examples, the inputs may be recorded as a change or difference from a previous input, and may be updated when a change increases or decreases below a threshold, indicating a significant difference.

At 820, method 800 includes determining a haptic response profile based at least in part on the haptic perception factor. In other words, based at least in part on the haptic perception factor, a haptic response profile may be determined to approximate the perception of a consistent amount of haptic feedback, accounting at least for any dampening of haptic sensation or otherwise reduction in haptic perception as a function of the set of input device inputs and the set of computing device inputs.

In some examples, the haptic response profile may be further based at least in part on a baseline haptic profile stored in memory, which may be retrieved responsive to recognizing a haptic trigger. A haptic trigger may be any action, generated by the touch-sensitive input device and/or the touch-sensitive computing device that is associated with and cues a haptic response at the touch-sensitive input device. As described with regard to FIGS. 2A and 2B, this may include a haptic trigger for automatic feedback, such as inking or erasing. As described with regard to FIGS. 3A and 3B, this may include a haptic trigger for interactive feedback, such as selecting a display object presented on a touch-sensitive display. Additionally or alternatively, haptic triggers may include device feedback and/or software feedback that is not driven by use of the touch-sensitive input device with the touch-sensitive computing device, such as a low battery warning or a calendar reminder.

The baseline haptic profile may be stored at the touch-sensitive input device, stored at the touch-sensitive computing device, or at another networked device. If stored at the touch-sensitive computing device, the baseline haptic profile may be pushed to the touch-sensitive input device. If stored at a networked storage device, the baseline haptic profile may be downloaded by either the touch-sensitive input device or the touch-sensitive computing device. In some examples, the baseline haptic profile may be loaded in memory at the touch-sensitive input device upon powering up and/or active use so it may be rapidly retrieved upon recognizing a haptic trigger.

The baseline haptic profile may be specific to the user, and may be stored as a user preference for the touch-sensitive input device. The baseline haptic profile may indicate a preferred amount of haptic sensation transferred to the user's fingertips for any haptic feedback. The baseline haptic profile may be predetermined, such as a default setting, may be directly selected by the user, and/or may be iteratively determined over the course of stylus usage by the user.

Based at least in part on the inputs, the haptic perception factor may represent the state of the user, and haptic intensity settings adjusted accordingly. This may enable consistent haptic feedback across a range of scenarios. Applying the haptic perception factor to the baseline haptic profile may be based at least in part on predetermined outcomes, such as those based at least in part on empirical data or simulations. Interpolation and inference may be used to generate a plurality of settings to achieve consistency in haptic feedback. A generic relationship may be provided that may be further adapted for each user over time. For example, some users may not press with as much force with their palm on the touch-sensitive computing device and thus not dampen the signal as much as others.

The haptic response profile may be further adjust based at least in part on application specific events, and/or user habits that correlate to either reduced perception or heightened perception (e.g., a stoic application vs a very busy application). In some examples, there may be a range or levels of haptic response within an application—(e.g., select a photo vs. crop a photo vs. are you sure you want to delete this photo?). The haptic response profile may include both amplitude and frequency components, such as when applied through a haptic motor.

At 830, method 800 includes actuating haptic devices of the touch-sensitive input device based at least in part on the determined haptic response profile. As described with regard to FIG. 1, the haptic devices may include haptic motors, electrostatic devices, ultrasonic devices, auditory devices, etc. In some examples, there may be concurrent feedback from the touch-sensitive computing device, be it haptic, visual, audible, or other feedback. In some examples, the haptic feedback may replace feedback from the touch-sensitive computing device. For some applications, such as inking and other automatic feedback modes, the haptic feedback may be inverted, with a reduction or loss of persistent haptic feedback as a signaling tool.

Optionally, at 840, method 800 may include determining a change in the haptic perception factor based at least in part on one or more of the set of input device inputs and the set of computing device inputs. For example, a change in any sensor output value contributing to the haptic perception factor is likely to affect a change in haptic perception. For example, a change in the haptic perception factor may be based at least in part on a change in contact area between a hand of the user and the touch-sensitive computing device. An increase in contact area may correspond to an increased haptic perception factor, while a decrease in contact area may correspond to a decreased haptic perception factor. However, the change in contact area may have a lower impact on the haptic perception factor as compared to other changed input values, such as contact pressure. In some examples, the change in haptic perception factor may be based at least in part on a change in posture of the touch-sensitive computing device, a change in the user's grip at the touch-sensitive input device body, a change in contact pressure between the touch-sensitive input device and the touch-sensitive computing device, etc.

Optionally, at 850, method 800 may include adjusting the haptic response profile based at least in part on the changed haptic perception factor and a baseline haptic profile, and, continuing at 860, method 800 may optionally include actuating the haptic devices of the touch-sensitive input device based at least in part on the adjusted haptic response profile. In this way, the user's perceived haptic feedback may remain consistent even as the haptic perception factor fluctuates.

Figure 9:
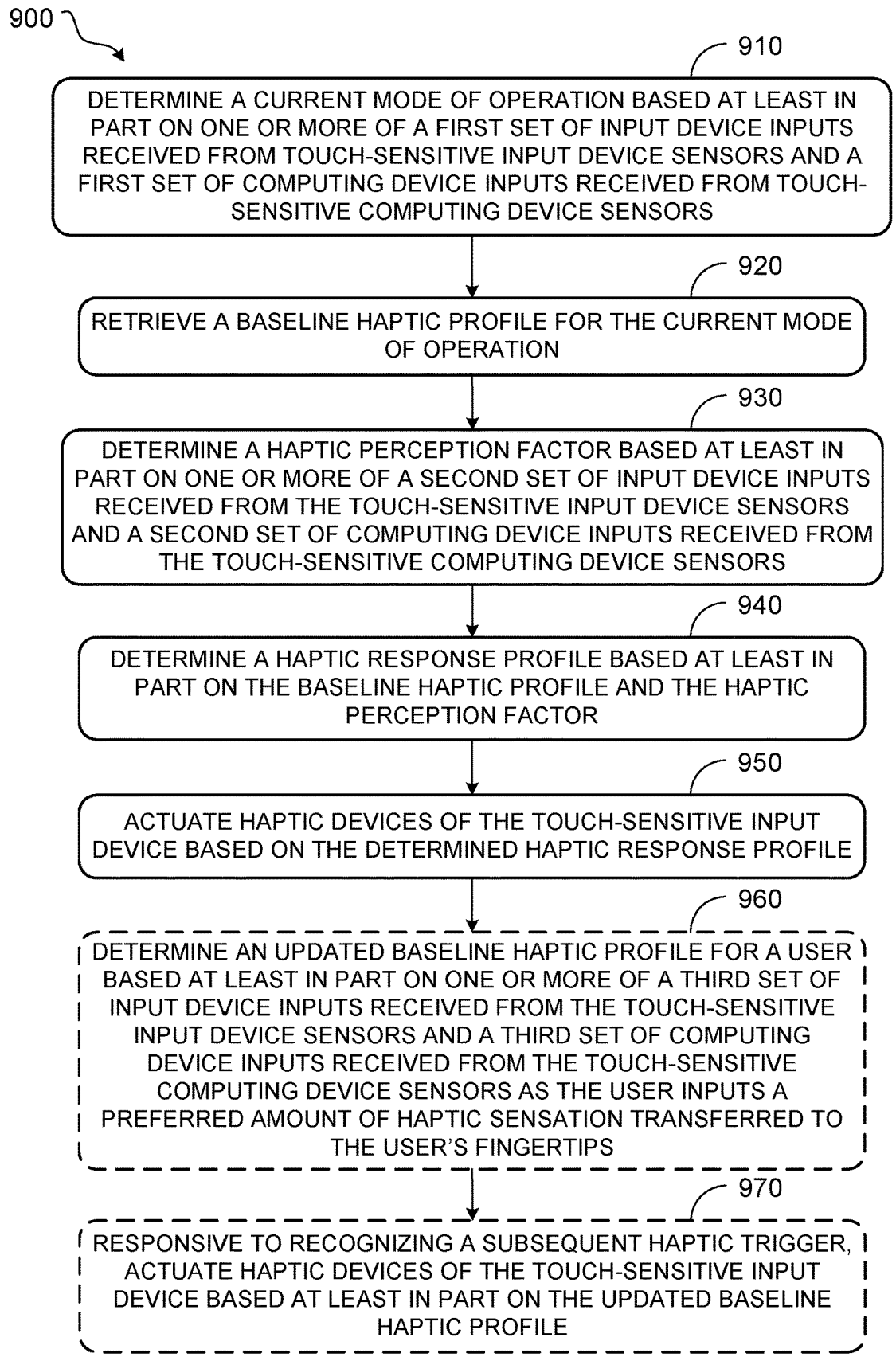
FIG. 9 depicts an example method for providing haptic feedback through a touch-sensitive input device being used to provide input to a touch-sensitive computing device.

FIG. 9 depicts an example method 900 for providing haptic feedback through a touch-sensitive input device being used to provide input to a touch-sensitive display. Method 900 may be executed by a touch-sensitive input device, such as stylus 100 when used in concert with a touch-sensitive computing device, such as computing device 104. In some examples, all or part of method 800 may be executed by a touch-sensitive computing device.

At 910, method 900 includes determining a current mode of operation based at least in part on one or more of a first set of input device inputs received from touch-sensitive input device sensors and a first set of computing device inputs received from touch-sensitive computing device sensors. For example, the current mode of operation may be an automatic feedback mode, such as inking, or an interactive feedback mode, such as a mode wherein display objects are selected based at least on a position of the touch-sensitive input device relative to a touch-sensitive display of the touch-sensitive computing device. The first set of input device inputs may include inputs regarding the orientation of the touch-sensitive input device, such as whether the tip of the touch-sensitive input device or the end of the touch-sensitive input device is oriented towards the touch-sensitive display. The first set of input device inputs may further include pressure values output by pressure sensors at the tip of the touch-sensitive input device, such as whether the touch-sensitive input device is contacting the touch-sensitive display or hovering over the touch-sensitive display. The first set of computing device inputs may include a status of an application executing on the touch-sensitive computing device, for example an automatic feedback mode may be determined based at least in part on an inking canvas being presented on the touch-sensitive display.

At 920, method 900 includes retrieving a baseline haptic profile for the current mode of operation. The baseline haptic profile may be retrieved as described with regard to FIG. 8, excepting that in some examples separate baseline haptic profiles may be maintained for each mode of operation. Such a retrieval may be performed in response to recognizing a haptic trigger. In examples where the current mode is an automatic feedback mode, the haptic trigger may be based at least in part on a tip of the touch-sensitive input device contacting the touch-sensitive computing device when the touch-sensitive computing device is presenting an inking canvas. In examples where the current mode is an interactive feedback mode, the haptic trigger may be based at least in part on a position of a tip of the touch-sensitive input device relative to content displayed on the touch-sensitive computing device, as described with regard to FIGS. 3A and 3B.

At 930, method 900 includes determining a haptic perception factor based at least in part on one or more of a second set of input device inputs received from the touch-sensitive input device sensors and a second set of computing device inputs received from the touch-sensitive computing device sensors. At 940, method 900 includes determining a haptic response profile based at least in part on the retrieved baseline haptic profile and the haptic perception factor. The haptic perception factor and haptic response profile may be determined as described with regard to FIG. 8, though the current mode of operation may influence both values.

At 950, method 900 includes actuating haptic devices of the touch-sensitive input device based at least in part on the determined haptic response profile. In some examples, the haptic devices may be actuated based at least in part on a first haptic response profile responsive to the haptic trigger being recognized when the tip of the touch-sensitive input device is contacting the display of the touch-sensitive computing device. Further, in some examples, the haptic devices may be actuated based at least in part on a second haptic response profile, different than the first haptic response profile, responsive to the haptic trigger being recognized when the tip of the touch-sensitive input device is hovering over the display of the touch-sensitive computing device.

Optionally, at 960, method 900 includes determining a baseline haptic profile for a user based at least in part on one or more of a third set of input device inputs received from the touch-sensitive input device sensors and a third set of computing device inputs received from the touch-sensitive computing device sensors as the user inputs a preferred amount of haptic sensation transferred to the user's fingertips. In other words, when a user is selecting a haptic profile, the input device inputs and computing device inputs may indicate the current state of the devices, and inform why a user is currently deciding to make an adjustment to their baseline haptic profile. For example, if the user's palm is contacting the touch-sensitive display, and they indicate to increase haptic intensity, it may be deduced that their palm is dampening haptic sensations greater than what is being accounted for. The coefficient for palm contact may thus be increased with regard to the haptic perception factor, and this calculation may be stored in the user's baseline haptic profile. Continuing at 970, method 900 may optionally include, responsive to recognizing a subsequent haptic trigger, actuating haptic devices of the touch-sensitive input device based at least in part on the updated baseline haptic profile.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
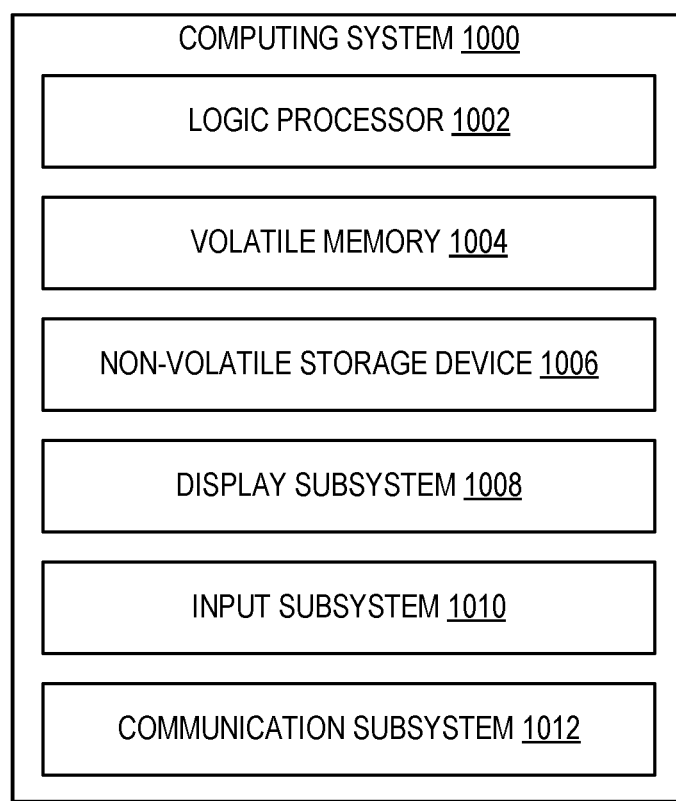
FIG. 10 shows a schematic depiction of an example computing environment in which the systems of FIG. 1 may be enacted.

FIG. 10 schematically shows a non-limiting embodiment of a computing system 1000 that can enact one or more of the methods and processes described above. Computing system 1000 is shown in simplified form. Computing system 1000 may embody the computing device 104 described above and illustrated in FIG. 1. Computing system 1000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic processor 1002 volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

In one example, a method for providing haptic feedback through a touch-sensitive input device configured to provide input to a touch-sensitive computing device comprises determining a haptic perception factor based at least in part on one or more of a set of input device inputs received from sensors of the touch-sensitive input device and a set of computing device inputs received from sensors of the touch-sensitive computing device; determining a haptic response profile based at least in part on the haptic perception factor; and actuating haptic devices of the touch-sensitive input device based at least in part on the determined haptic response profile. In such an example, or any other example, the haptic response profile is further additionally or alternatively based at least in part on a baseline haptic profile stored in memory. In any of the preceding examples, or any other example, the baseline haptic profile is additionally or alternatively specific to a user. In any of the preceding examples, or any other example, the method additionally or alternatively comprises determining a change in the haptic perception factor based at least in part on one or more of the set of input device inputs and the set of computing device inputs; adjusting the haptic response profile based at least in part on the changed haptic perception factor and the baseline haptic profile; and actuating the haptic devices of the touch-sensitive input device based at least in part on the adjusted haptic response profile. In any of the preceding examples, or any other example, the change in the haptic perception factor is additionally or alternatively based at least in part on computing device inputs indicating a change in contact area between a hand of a user and the touch-sensitive computing device. In any of the preceding examples, or any other example, the change in haptic perception factor is additionally or alternatively based at least on computing device inputs indicating a change in posture of the touch-sensitive computing device. In any of the preceding examples, or any other example, the change in haptic perception factor is additionally or alternatively based at least on input device inputs indicating a change in a user's grip at the touch-sensitive input device. In any of the preceding examples, or any other example, the change in haptic perception factor is additionally or alternatively based at least on one or more of computing device inputs and input device inputs indicating a change in contact pressure between the touch-sensitive input device and the touch-sensitive computing device.

In another example, a method for providing haptic feedback through a touch-sensitive input device configured to provide input to a touch-sensitive computing device comprises determining a current mode of operation based at least in part on one or more of a first set of input device inputs received from touch-sensitive input device sensors and a first set of computing device inputs received from touch-sensitive computing device sensors; retrieving a baseline haptic profile for the current mode of operation; determining a haptic perception factor based at least in part on one or more of a second set of input device input device inputs received from the touch-sensitive input device sensors and a second set of computing device inputs received from the touch-sensitive computing device sensors; determining a haptic response profile based at least in part on the retrieved baseline haptic profile and the haptic perception factor; and actuating haptic devices of the touch-sensitive input device based at least in part on the determined haptic response profile.

In such an example, or any other example, the haptic perception factor is additionally or alternatively determined in response to recognizing a haptic trigger. In any of the preceding examples, or any other example, the current mode is additionally or alternatively an interactive feedback mode, and wherein the haptic trigger is based at least in part on a position of a tip of the touch-sensitive input device relative to content displayed on the touch-sensitive computing device. In any of the preceding examples, or any other example, the haptic devices are additionally or alternatively actuated based at least in part on a first haptic response profile responsive to the haptic trigger being recognized when the tip of the touch-sensitive input device is contacting a display of the touch-sensitive computing device. In any of the preceding examples, or any other example, the haptic devices are additionally or alternatively actuated based at least in part on a second haptic response profile responsive to the haptic trigger being recognized when the tip of the touch-sensitive input device is hovering over the display of the touch-sensitive computing device. In any of the preceding examples, or any other example, the current mode is additionally or alternatively an automatic feedback mode, and wherein the haptic trigger is based at least in part on a tip of the touch-sensitive input device contacting the touch-sensitive computing device when the touch-sensitive computing device is presenting an inking canvas. In any of the preceding examples, or any other example, the method additionally or alternatively comprises determining an updated baseline haptic profile for a user based at least in part on a third set of input device input device inputs received from the touch-sensitive input device sensors and a third set of computing device inputs received from the touch-sensitive computing device sensors as the user inputs a preferred amount of haptic sensation transferred to the user's fingertips; and responsive to recognizing a subsequent haptic trigger, actuating haptic devices of the touch-sensitive input device based at least in part on the updated baseline haptic profile.

In yet another example, a haptic stylus comprises a body; one or more haptic devices within the body; a communications subsystem; a sensor subsystem; and a controller configured to: determine a haptic perception factor based at least in part on one or more of a set of input device inputs received from the sensor subsystem and a set of computing device inputs received from sensors of a touch-sensitive computing device via the communications subsystem; determine a haptic response profile based at least in part on the determined haptic perception factor; and actuate the haptic devices at the determined haptic response profile. In such an example, or any other example, the sensor subsystem additionally or alternatively includes one or more pressure sensors coupled to a stylus tip. In any of the preceding examples, or any other example, the sensor subsystem additionally or alternatively includes one or more pressure sensors coupled to a stylus end. In any of the preceding examples, or any other example, the sensor subsystem additionally or alternatively includes one or more grip sensors positioned around a circumference of the body. In any of the preceding examples, or any other example, the controller is additionally or alternatively configured to determine a change in the haptic perception factor based at least in part on one or more of the set of input device inputs and the set of computing device inputs; adjust the haptic response profile based at least in part on the changed haptic perception factor; and actuate the haptic devices of the stylus based at least in part on the adjusted haptic response profile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing haptic feedback through a touch-sensitive input device configured to provide input to a touch-sensitive computing device, comprising:
   determining a haptic perception factor based at least in part on a set of computing device inputs received from sensors of the touch-sensitive computing device, the computing device inputs including at least a posture of the touch-sensitive computing device;
determining a haptic response profile based at least in part on the haptic perception factor;
actuating haptic devices of the touch-sensitive input device based at least in part on the determined haptic response profile;
determining a change in the haptic perception factor based at least in part on a change in the posture of the touch-sensitive computing device;
adjusting the haptic response profile based at least in part on the changed haptic perception factor; and
actuating the haptic devices of the touch-sensitive input device based at least in part on the adjusted haptic response profile.

2. The method of claim 1 wherein the haptic response profile is further based at least in part on a baseline haptic profile stored in memory.

3. The method of claim 2, wherein the baseline haptic profile is specific to a user.

4. The method of claim 1, wherein the haptic perception factor is further based at least on a set of input device inputs received from sensors of the touch-sensitive input device.

5. The method of claim 1, wherein the posture of the touch-sensitive computing device comprises an indication as to whether a face of the touch-sensitive computing device opposite a touch-sensitive display is contacting an external surface.

6. The method of claim 5, wherein the indication as to whether the face of the touch-sensitive computing device opposite the touch-sensitive display is contacting the external surface comprises a pliability of the external surface.

7. The method of claim 1, wherein the posture of the touch-sensitive computing device comprises an indication as to whether the touch-sensitive computing device is being held in a first hand of a user while the touch-sensitive input device is being held in a second hand of the user.

8. The method of claim 1, wherein the posture of the touch-sensitive computing device comprises an indication as to whether the touch-sensitive computing device is being supported by a kickstand opposite the touch-sensitive display.

9. A method for providing haptic feedback through a touch-sensitive input device configured to provide input to a foldable touch-sensitive computing device, comprising:
determining a haptic perception factor based at least in part on a set of computing device inputs received from sensors of the foldable touch-sensitive computing device, the foldable touch-sensitive computing device including at least a first touch-sensitive display coupled to a second touch-sensitive display via a hinge, the computing device inputs including at least a posture of the foldable touch-sensitive computing device;
determining a haptic response profile based at least in part on the haptic perception factor;
actuating haptic devices of the foldable touch-sensitive input device based at least in part on the determined haptic response profile;
determining a change in the haptic perception factor based at least in part on a change in the posture of the foldable touch-sensitive computing device;
adjusting the haptic response profile based at least in part on the changed haptic perception factor; and
actuating the haptic devices of the touch-sensitive input device based at least in part on the adjusted haptic response profile.

10. The method of claim 9, wherein the posture of the foldable touch-sensitive computing device comprises an indication as to an angle between the first touch-sensitive display and the second touch-sensitive display.

11. The method of claim 9, wherein the posture of the foldable touch-sensitive computing device comprises an indication as to whether a face of the touch-sensitive computing device opposite the first touch-sensitive display is contacting an external surface.

12. The method of claim 9, wherein the posture of the foldable touch-sensitive computing device comprises an indication as to whether a face of the foldable touch-sensitive computing device opposite the second touch-sensitive display is contacting an external surface.

13. The method of claim 9, wherein the posture of the foldable touch-sensitive computing device comprises an indication as to whether the foldable touch-sensitive computing device is being held in a first hand of a user while the touch-sensitive input device is being held in a second hand of the user.

14. The method of claim 9, wherein the set of computing device inputs includes a heat map for the second touch-sensitive display.

15. A haptic stylus, comprising:
a body;
one or more haptic devices within the body;
a communications subsystem;
a sensor subsystem; and
a controller configured to:
determine a haptic perception factor based at least in part on a set of computing device inputs received from sensors of a touch-sensitive computing device, the computing device inputs including at least a posture of the touch-sensitive computing device;
determine a haptic response profile based at least in part on the haptic perception factor;
actuate the haptic devices of haptic stylus based at least in part on the determined haptic response profile;
determine a change in the haptic perception factor based at least in part on a change in the posture of the touch-sensitive computing device;
adjust the haptic response profile based at least in part on the changed haptic perception factor; and
actuate the haptic devices of haptic stylus based at least in part on the adjusted haptic response profile.

16. The haptic stylus of claim 15, wherein the posture of the touch-sensitive computing device comprises an indication as to whether a face of the touch-sensitive computing device opposite a touch-sensitive display is contacting an external surface.

17. The haptic stylus of claim 15 wherein the posture of the touch-sensitive computing device comprises an indication as to whether the touch-sensitive computing device is being held in a first hand of a user while the touch-sensitive input device is being held in a second hand of the user.

18. The haptic stylus of claim 15, wherein the touch-sensitive computing device is a foldable touch-sensitive computing device including at least a first touch-sensitive display coupled to a second touch-sensitive display via a hinge, and wherein the posture of the foldable touch-sensitive computing device comprises an indication as to an angle between the first touch-sensitive display and the second touch-sensitive display.

19. The haptic stylus of claim 18, wherein the posture of the foldable touch-sensitive computing device comprises an indication as to whether a face of the foldable touch-sensitive computing device opposite the second touch-sensitive display is contacting an external surface.

20. The haptic stylus of claim 18, wherein the set of computing device inputs includes a heat map for the second touch-sensitive display.

\* \* \* \* \*